(12) United States Patent
Matsunaga et al.

(10) Patent No.: US 7,964,541 B2
(45) Date of Patent: Jun. 21, 2011

(54) LUBRICANT COMPOSITION FOR POLISHING A MAGNETIC HEAD WITH FIXED ABRASIVE GRAINS

(75) Inventors: Tomonori Matsunaga, Shunan (JP); Yuki Watahiki, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 603 days.

(21) Appl. No.: 11/885,802

(22) PCT Filed: Mar. 7, 2006

(86) PCT No.: PCT/JP2006/304835
§ 371 (c)(1), (2), (4) Date: Sep. 6, 2007

(87) PCT Pub. No.: WO2006/095894
PCT Pub. Date: Sep. 14, 2006

(65) Prior Publication Data
US 2008/0176779 A1    Jul. 24, 2008

(30) Foreign Application Priority Data

Mar. 8, 2005 (JP) .................................. 2005-064011

(51) Int. Cl.
*C10M 137/12* (2006.01)
*C10M 135/10* (2006.01)

(52) U.S. Cl. ........ 508/406; 508/410; 508/421; 508/547; 508/564

(58) Field of Classification Search .................. 162/156; 508/571, 259, 406, 410, 421, 547, 531, 532, 508/579, 583; 546/537
See application file for complete search history.

(56) References Cited

U.S. PATENT DOCUMENTS

| | | | | |
|---|---|---|---|---|
| 2,415,833 | A * | 2/1947 | Mikeska et al. | 508/571 |
| 3,903,002 | A * | 9/1975 | Hotten | 508/259 |
| 4,681,658 | A * | 7/1987 | Hsu et al. | 162/156 |
| 2001/0009840 | A1 | 7/2001 | Orii et al. | |
| 2006/0264642 | A1 * | 11/2006 | Wasserscheid et al. | 546/347 |

FOREIGN PATENT DOCUMENTS

| | | |
|---|---|---|
| JP | 62-292358 A | 12/1987 |
| JP | 3-92264 A | 4/1991 |
| JP | 7-299737 A | 11/1995 |
| JP | 9-245333 A | 9/1997 |
| JP | 2001-200244 A | 7/2001 |
| JP | 2004-58220 A | 2/2004 |
| JP | 2004-285354 A | 10/2004 |
| JP | 2005-187616 A | 7/2005 |

OTHER PUBLICATIONS

Yoshiaki Mizoo, et al., [online], International Disk Drive Equipment Materials Association Japan, IDEMA Japan News No. 55, July and August editions of 2003.

* cited by examiner

*Primary Examiner* — Ellen M McAvoy
*Assistant Examiner* — Chantel Graham
(74) *Attorney, Agent, or Firm* — Birch, Stewart, Kolasch & Birch, LLP

(57) ABSTRACT

Composition comprising 0.001-4.999 parts by mass of an organic onium salt e.g. tetraoctylammonium•bis(trifluoromethanesulfonyl)imide of formula (I):

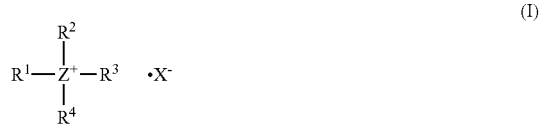

wherein Z is N or P, $R^1, R^2, R^3$ and $R^4$ are each independently $C_4$-$C_{20}$-hydrocarbon, providing that the ratio of the number of carbons of a group having the largest number of carbons to the number of carbons of a group having the smallest number of carbons in $R^1, R^2, R^3$ and $R^4$ is 2 or less, $X^-$ is an anion of formula (II):

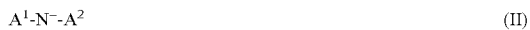

wherein $A^1$ and $A^2$ are each independently fluoroacyl, and 0.001-4.999 parts by mass of a $C_8$-$C_{25}$-fatty acid based on 100 parts by mass of a hydrocarbon solvent, the total amount of the organic onium salt and the fatty acid being 0.01-5 parts by mass. The composition maintains high productivity without causing breakdown or reduction in reliability caused by charge in the step of finally polishing a magnetic head.

3 Claims, No Drawings

LUBRICANT COMPOSITION FOR POLISHING A MAGNETIC HEAD WITH FIXED ABRASIVE GRAINS

This application is the U.S. national phase under 35 U.S.C. 371 of PCT/JP2006/304835, which was filed on Mar. 7, 2006. Priority under 35 U.S.C. 119 claimed to Japanese application 2005-064011, which was filed on Mar. 8, 2005.

TECHNICAL FIELD

The present invention relates to a lubricant which is used to polish a magnetic head with fixed abrasive grains. More specifically, it relates to a lapping oil composition used in the step of finally polishing the read surface of a magnetic head with fixed abrasive grains after it is polished with floating abrasive grain slurry.

BACKGROUND ART

The memory capacity of a HDD (Hard Disk Drive) used as a recording apparatus for not only computers but also digital home appliances and portable music terminals is increasing rapidly. To increase the memory capacity, recording medium technology, control motor technology and magnetic head technology assume great roles. Out of these, the development of a magnetic head or a slider which floats at a height of several nm to read information recorded on a recording medium is important. To increase the memory capacity, the development of a thin magnetic head is now under way to further reduce the amount of floatation, that is, the distance between a recording medium and a thin film type magnetic head and the thickness of the thin film.

In general, this magnetic head is manufactured by forming and patterning a protective/insulating layer made of $Al_2O_3$ and a magnetic metal film made of Fe—Ni or Fe—Al—Si on a high-hardness ceramic substrate made of $Al_2O_3$—TiC, cutting and polishing them, forming a protective coat and surface finishing it. An air bearing surface, that is, a data read and write surface which floats by an air flow generated by the revolution of a recording medium, has been polished by using floating abrasive grain slurry. However, materials constituting the above magnetic head differ from one another in polishing ease, the smoothness of the floating surface of the magnetic head does not become satisfactory with a method using the floating abrasive grain slurry, the magnetic metal film which is a soft material is selectively polished, and the distance between the recoding medium and the magnetic metal surface becomes substantially long. The floating distance is becoming shorter due to a recent increase in memory capacity, and an increase in the distance by the selective polishing cannot be ignored.

Further, a scratch which is formed across the polished surface by the floating abrasive grains causes an electric short-circuit and deteriorates the characteristic properties of the magnetic head.

Then, to avoid this problem, there is proposed a method in which, after the air floating surface is polished with floating abrasive grain slurry, precision final polishing is carried out with lapping oil containing no floating abrasive grains (refer to JP-A 62-292358, JP-A 3-92264, JP-A 7-299737, JP-A 9-245333 and JP-A 2004-58220).

In the above method, after rough polishing is carried out with free abrasive grain slurry, final polishing is carried out by using lapping oil containing no abrasive grains to remove free abrasive grains which cause scratching or selective polishing so as to polish only with abrasive grains fixed on a plate, thereby obtaining a high-quality polished surface.

Meanwhile, due to a reduction in the thickness of an electric shield gap and use of a GMR (Giant Magneto-Resistive) head having a magnetically complex structure along with a rapid increase in the surface recording density of HDD, the damage of a magnetic head by ESD (Electrostatic Discharge) in the process of manufacturing the magnetic head is becoming a more and more serious problem. Since the damage of the magnetic head by ESD causes problems such as reductions in yield and the reliability of HDD, ESD countermeasures for the magnetic head are very important (refer to "ESD phenomenon in a HDD manufacturing process using a GMR head" written by Yoshiaki Mizoo, et al., [online], International Disk Drive Equipment Materials Association Japan, IDEMA Japan News No. 55, Jul. and Aug. editions of 2003).

In the conventional method in which polishing is carried out by using abrasive grains fixed on a platen and supplying a lubricating oil containing no abrasive grains, a lubricating oil containing a hydrocarbon solvent such as n-paraffin, isoparaffin or naphthene and additives has been used (refer to JP-A 2004-58220). However, the lubricating oil is insulating and has a problem that the magnetic head is destructed or the reliability of the magnetic head is reduced by accumulated static charge during polishing. However, a lubricating oil composition which meets the requirements for polishing rate and surface smoothness of an object to be polished while preventing charge by static electricity has not been studied much. As means of providing antistatic properties, there is a method in which a surfactant is added. However, as this causes the corrosion of the magnetic portion of the magnetic head, it is difficult to provide sufficiently high antistatic properties by adding a surfactant.

As a cleaner for removing a stain such as wax adhering to such an electronic part in its production process, there is known one which comprises a hydrocarbon solvent and an organic onium salt such as tetraoctylammonium.2,2,2-trifluoro-N-(trifluoromethanesulfonyl)acetamide (refer to JP-A 2004-285354). Although this cleaner has excellent antistatic properties and rarely causes the breakdown of a device during cleaning due to the function of the above organic onium salt, use of this cleaner in a lubricant for polishing the above magnetic head is utterly unknown.

DISCLOSURE OF THE INVENTION

It is therefore an object of the present invention to provide a lubricant composition for final polishing which can maintain sufficiently high productivity without causing the breakdown of a magnetic head and a reduction in the reliability of the magnetic head by charge in the step of finally polishing the magnetic head.

The inventors of the present invention have conducted intensive studies to solve the above problems. They have found that sufficiently high antistatic properties can be provided while a high polishing rate is maintained by adding a predetermined amount of a mixture of an organic onium salt having a specific structure and a fatty acid to a hydrocarbon solvent.

That is, the present invention is a lubricant composition which comprises:
(1) 100 parts by mass of a hydrocarbon solvent;
(2) 0.001 to 4.999 parts by mass of an organic onium salt represented by the following formula (I):

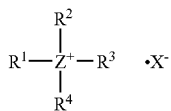
(I)

wherein Z is a nitrogen atom or a phosphorus atom, $R^1$, $R^2$, $R^3$ and $R^4$ are each independently a hydrocarbon group having 4 to 20 carbon atoms, with the proviso that the ratio of the number of carbon atoms of a hydrocarbon group having the largest number of carbon atoms to the number of carbon atoms of a hydrocarbon group having the smallest number of carbon atoms out of $R^1$, $R^2$, $R^3$ and $R^4$ is 2 or less, and $X^-$ is an anion represented by the following formula (II):

$$A^1\text{-}N^-\text{-}A^2 \quad (II)$$

wherein $A^1$ and $A^2$ are each independently a fluoroacyl group, fluoroalkoxycarbonyl group, fluoroalkylsulfonyl group, fluoroalkoxysulfonyl group or nitrile group.; and (3) 0.001 to 4.999 parts by mass of a fatty acid having 8 to 25 carbon atoms, the total amount of the organic onium salt and the fatty acid being 0.01 to 5 parts by mass, and which is used to polish a magnetic head with fixed abrasive grains.

BEST MODE FOR CARRYING OUT THE INVENTION

The lubricant composition of the present invention comprises (1) a hydrocarbon solvent as the main component. By using the hydrocarbon solvent as the main component, the water absorptivity of the lubricant composition can be reduced and the corrosion of the magnetic head by the existence of water can be suppressed. A known hydrocarbon may be used as the hydrocarbon solvent of the lubricant composition. Examples of the hydrocarbon solvent include saturated hydrocarbon solvents such as normal paraffin-based hydrocarbons including nonane, decane, undecane and dodecane, isoparaffin-based hydrocarbons including 2,2,4-trimethylpentane, 2,2,4,6,6-pentamethylheptane, 2-methylpentane and 2,2-dimethylbutane, and naphthene-based hydrocarbons including cyclohexane, cyclooctane, cyclodecane and decahydronaphthalene; aromatic hydrocarbon solvents such as benzene, toluene and xylene; and mixtures thereof. Since a solvent having a low evaporation rate is suitable in order to carry out safe and stable polishing by eliminating the evaporation of the solvent during polishing, a hydrocarbon solvent having a boiling point of preferably 100° C. or higher, more preferably 120° C. or higher is used in the present invention. When the kinetic viscosity of the hydrocarbon solvent is too high, the polishing rate of the magnetic head becomes low, thereby reducing productivity. Therefore, a hydrocarbon solvent having a kinetic viscosity of 10 mm$^2$/s or less is preferred and a hydrocarbon solvent having a kinetic viscosity of 5 mm$^2$/s or less is more preferred. A mixture of two or more hydrocarbon solvents may be used in the lubricant composition of the present invention. In this case, the boiling point of a hydrocarbon solvent having the lowest boiling point out of these hydrocarbon solvents is preferably 100° C. or higher, more preferably 120° C. or higher. The kinetic viscosity of a mixed solvent is preferably 10 mm$^2$/s or less, more preferably 5 mm$^2$/s or less.

The lubricant composition of the present invention comprises (2) 0.001 to 4.999 parts by mass based on 100 parts by mass of the above hydrocarbon solvent of an organic onium salt represented by the following formula (I) (to be simply referred to as "organic onium salt" hereinafter) as an antistatic component:

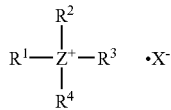
(I)

wherein Z is a nitrogen atom or a phosphorus atom, $R^1$, $R^2$, $R^3$ and $R^4$ are each independently a hydrocarbon group having 4 to 20 carbon atoms, with the proviso that the ratio of the number of carbon atoms of a hydrocarbon group having the largest number of carbon atoms to the number of carbon atoms of a hydrocarbon group having the smallest number of carbon atoms out of $R^1$, $R^2$, $R^3$ and $R^4$ is 2 or less, and $X^-$ is an anion represented by the following formula (II):

$$A^1\text{-}N^-\text{-}A^2 \quad (II)$$

wherein $A^1$ and $A^2$ are each independently a fluoroacyl group, fluoroalkoxycarbonyl group, fluoroalkylsulfonyl group, fluoroalkoxysulfonyl group or nitrile group.

It has been believed that when an ordinary ionic compound is contained in a lubricant used for polishing, a reduction in polishing rate and the promotion of the corrosion of a metal are caused by the agglomeration of polishing sludge. However, the corrosion of the metal can be suppressed by using the specific onium salt represented by the above formula (I), and the agglomeration of the polishing sludge can be suppressed and a sufficiently high polishing rate can be obtained by combining the organic onium salt with a fatty acid having 8 to 25 carbon atoms which will be described hereinafter.

In the above formula (I), Z is a nitrogen atom or a phosphorus atom. That is, the organic onium salt represented by the above formula (I) is a quaternary ammonium salt having a quaternary ammonium cation or a quaternary phosphonium salt having a quaternary phosphonium cation.

In the cation moiety of the organic onium salt represented by the above formula (I), $R^1$, $R^2$, $R^3$ and $R^4$ bonded to Z as the center atom are each independently a hydrocarbon group having 4 to 20 carbon atoms.

When any one of $R^1$, $R^2$, $R^3$ and $R^4$ is a group having 3 or less carbon atoms, the solubility in the above hydrocarbon solvent of the organic onium salt drops excessively, whereby the onium salt cannot be dissolved in an amount from which sufficiently antistatic properties can be obtained, or a large amount of a polar solvent must be added to dissolve the onium salt and the corrosion of the magnetic head is apt to occur. Further, when any one of $R^1$, $R^2$, $R^3$ and $R^4$ is a hydrogen atom, the thermal stability of the onium salt itself lowers, in addition to the above problem.

When any one of $R^1$, $R^2$, $R^3$ and $R^4$ is a group having 21 or more carbon atoms, sufficiently high antistatic properties cannot be obtained. The reason for this is unknown but it is assumed that the mobility of ions drops when the organic onium salt is dissolved in the hydrocarbon solvent due to increased interaction between onium cations.

Further, in the above onium salt to be contained in the lubricant composition of the present invention, although all of $R^1$, $R^2$, $R^3$ and $R^4$ may or may not be the same hydrocarbon group, the ratio of the number of carbon atoms of a hydrocarbon group having the largest number of carbon atoms (to be referred to as "largest hydrocarbon group" hereinafter) to the number of carbon atoms of a hydrocarbon group having the smallest number of carbon atoms (to be referred to as "smallest hydrocarbon group" hereinafter) must be 2 or less. When the ratio of the number of carbon atoms of the largest hydrocarbon group to the number of carbon atoms of the smallest hydrocarbon group is more than 2, sufficiently high antistatic properties cannot be obtained as well. It is assumed that this is because an anion enters the smallest hydrocarbon group and wrapped around by the other larger hydrocarbon group to be stabilized, thereby reducing the degree of dissociation between the anion and the cation. To attain the above effect to the fullest, the difference between the number of carbon atoms of the hydrocarbon group having the largest number of carbon atoms and the number of carbon atoms of the hydrocarbon group having the smallest number of carbon atoms is preferably 8 or less, more preferably 3 or less.

The hydrocarbon group having 4 to 20 carbon atoms may be linear, branched or cyclic and may be a known hydrocarbon group. Examples of the hydrocarbon group include alkyl groups having 4 to 20 carbon atoms such as butyl group, hexyl group, octyl group, 2-ethylhexyl group and octadecyl group, aryl groups having 6 to 20 carbon atoms such as phenyl group, naphthyl group and tolyl group, and aralkyl group having 7 to 20 carbon atoms such as benzyl group. Alkyl groups having 4 to 20 carbon atoms are preferred, and alkyl groups having 6 to 15 carbon atoms are more preferred from the viewpoints of solubility and chemical stability.

A substituent, for example, halogen atom such as fluorine atom, chlorine atom or bromine atom, or an alkoxy group having 1 to 10 carbon atoms such as methoxy group or ethoxy group may be bonded to the hydrocarbon groups represented by $R^1$, $R^2$, $R^3$ and $R^4$. However, a hydrocarbon group having no substituent is more preferred from the viewpoint of solubility into the hydrocarbon solvent, the water absorptivity of the organic onium salt, chemical stability and environmental load.

Examples of the quaternary ammonium cation and quaternary phosphonium cation in the organic onium salt represented by the above formula (I) include symmetric quaternary ammonium cations in which all $R^1$ to $R^4$ bonded to the center nitrogen atom are the same, such as tetrabutylammonium cation, tetrahexylammonium cation, tetraoctylammonium cation and tetradecylammonium cation; pseudo-symmetric quaternary ammonium cations in which one or two of $R^1$ to $R^4$ differ from the others, such as butyltrioctylammonium cation, hexyltrioctylammonium cation, tridecyloctylammonium cation, dibutyldioctylammonium cation, dihexyldioctylammonium cation, benzyltrioctylammonium cation and phenyltrihexylammonium cation; symmetric phosphonium cations in which all $R^1$ to $R^4$ are the same, such as tetrabutylphosphonium cation and tetraoctylphosphonium cation; and pseudo-symmetric quaternary phosphonium cations in which one or two of $R^1$ to $R^4$ differ from the others, such as butyltrioctylphosphonium cation, hexyltrioctylphosphonium cation, tridecyloctylphosphonium cation, dibutyldioctylphosphonium cation and dihexyldioctylphosphonium cation. Out of these, symmetric quaternary ammonium cations are particularly preferably used because high antistatic properties can be obtained with a small amount.

X$^-$ which is the anion of the organic onium salt represented by the above formula (I) is an anion represented by the following formula (II):

$$A^1\text{-}N^-\text{-}A^2 \qquad (\text{II})$$

wherein $A^1$ and $A^2$ are each independently a fluoroacyl group, fluoroalkoxycarbonyl group, fluoroalkylsulfonyl group, fluoroalkoxysulfonyl group or nitrile group.

In the above formula (II), when $A^1$ and $A^2$ are each an anion other than the fluoroacyl group, fluoroalkoxycarbonyl group, fluoroalkylsulfonyl group, fluoroalkoxysulfonyl group and nitrile group, the other anion cannot be existent stably, the organic onium salt is hardly dissolved in the hydrocarbon solvent, or required antistatic properties are not obtained as dissociation is not satisfactory even when the organic onium salt is dissolved. The lubricant composition of the present invention comprises a fatty acid having 8 to 25 carbon atoms together with the organic onium salt represented by the above formula (I) which will be described as hereinafter. When $A^1$ and $A^2$ of the organic onium salt are the above groups other than the fluoroalkylsulfonyl group and the nitrile group and the lubricant composition is kept for a long time, the anion of the organic onium salt may be decomposed gradually by the function of the above fatty acid. Therefore, in consideration of the stability of long-term storage, $A^1$ and $A^2$ of the organic onium salt are each particularly preferably a fluoroalkylsulfonyl group or nitrile group.

Examples of the fluoroacyl group include trifluoroacetyl group and pentafluoropropionyl group, examples of the fluoroalkoxycarbonyl group include perfluoromethoxyacetyl group and perfluoromethoxypropionyl group, examples of the fluoroalkylsulfonyl group include trifluoromethanesulfonyl group, pentafluoroethanesulfonyl group and nonafluorobutanesulfonyl group, and examples of the fluoroalkoxysulfonyl group include perfluoromethoxymethanesulfonyl group and perfluoromethoxyethanesulfonyl group. $A^1$ and $A^2$ are each preferably a group having 3 or less carbon atoms, more preferably a group having 2 or less carbon atoms because high antistatic properties can be obtained with a smaller amount.

Examples of the anion represented by the above formula (II) include sulfonylamide anions such as bis(trifluoromethanesulfonyl)imide anion, bis(pentafluoroethanesulfonyl)imide anion and trifluoromethanesulfonyl nonafluorobutanesulfonylamide anion, and sulfonylacylamide anions such as 2,2,2-trifluoro-N-(trifluoromethanesulfonyl)acetamide anion, 2,2,2-trifluoro-N-(perfluoroethanesulfonyl)acetamide anion, 2,2,2-trifluoro-N-(perfluoropropanesulfonyl)acetamide anion, 2,2,3,3,3-pentafluoro-N-(trifluoromethanesulfonyl) propionamide anion, 2,2,3,3,3-pentafluoro-N-(perfluoroethanesulfonyl) propionamide anion and 2,2,3,3,3-pentafluoro-N-(perfluoropropanesulfonyl) propionamide anion. Out of these, bis(trifluoromethanesulfonyl)imide anion and 2,2,2-trifluoro-N-(trifluoromethanesulfonyl)acetamide anion are preferred because high antistatic properties can be obtained with a small amount, and bis(trifluoromethanesulfonyl)imide anion is particularly preferred as storage stability is high.

A combination of the above anion and the above organic onium cation in the organic onium salt used in the composition of the present invention is not particularly limited. Particularly preferred examples of the organic onium salt include bis(trifluoromethanesulfonyl)imide exemplified by symmetric ammonium.bis(trifluoromethanesulfonyl)imides such as tetrabutylammonium. bis(trifluoromethanesulfonyl)imide, tetrahexylammonium. bis(trifluoromethanesulfonyl)imide, tetraoctylammonium. bis(trifluoromethanesulfonyl)imide and tetradecylammonium.bis(trifluoromethanesulfonyl) imide; symmetric phosphonium.bis(trifluoromethanesulfonyl)imides such as tetrabutylphosphonium. bis(trifluoromethanesulfonyl)imide and tetraoctylphosphonium. bis(trifluoromethanesulfonyl)imide; symmetric ammonium.2,2,2-trifluoro-N-(trifluoromethanesulfonyl)acetamides such as tetrabutylammonium.2,2,2-trifluoro-N-(trifluoromethanesulfonyl)acetamide, tetrahexylammonium.2,2,2-trifluoro-N-(trifluoromethanesulfonyl)acetamide, tetraoctylammonium.2,2,2-trifluoro-N-(trifluoromethanesulfonyl)

acetamide and tetradecylammonium.2,2,2-trifluoro-N-(trifluoromethanesulfonyl)acetamide; symmetric phosphonium.2,2,2-trifluoro-N-(trifluoromethanesulfonyl)acetamides such as tetrabutylphosphonium.2,2,2-trifluoro-N-(trifluoromethanesulfonyl)acetamide and tetraoctylphosphonium.2,2,2-trifluoro-N-(trifluoromethanesulfonyl)acetamide; and symmetric phosphonium. bis(trifluoromethanesulfonyl)imides such as tetrabutylphosphonium.bis(trifluoromethanesulfonyl)imide and tetraoctylphosphonium. bis(trifluoromethanesulfonyl)imide. By using the above compound, high antistatic properties can be obtained with a small amount and the hydrophobic nature of the lubricant composition can be made high, thereby eliminating problems such as water absorption and corrosion and deterioration caused by water absorption.

A combination of two or more organic onium salts which differ from each other in the cation moiety and/or the anion moiety may be optionally used as the above organic onium salt to be contained in the lubricant composition of the present invention.

The lubricant composition of the present invention comprises a fatty acid having 8 to 25 carbon atoms. Although the polishing rate is apt to be reduced by adding the above organic onium salt, the addition of a suitable amount of the fatty acid has the effect of improving the polishing rate.

A known chain monocarboxylic acid having 8 to 25 carbon atoms and a straight chain or a side chain may be used as the fatty acid without limitation. The polishing rate of the magnetic head can be made high and the polished surface can be made smooth by using this fatty acid. The polishing rate becomes impractically low when a fatty acid having 26 or more carbon atoms is used, which is probably because the viscosity of the obtained lubricant composition becomes high. A fatty acid having 7 or less carbon atoms has high volatility and generates a bad smell during polishing, thereby worsening working environment. When a compound having a plurality of carboxyl groups such as dicarboxylic acid is used, the dissolution of the metal portion of the magnetic head proceeds probably due to its chelating effect, thereby producing a processing level difference. Further, when a dicarboxylic acid- or phosphoric acid-based compound is used, the polishing rate drops, or the compounds cannot be removed from the surface of the magnetic head by washing after polishing, whereby surface smoothness may be impaired.

Examples of the fatty acid having 8 to 25 carbon atoms preferably used in the present invention include linear saturated fatty acids such as octanoic acid, decanoic acid, dodecanoic acid, tetradecanoic acid, hexadecanoic acid, octadecanoic acid, eicosanoic acid and docosanoic acid; branched saturated fatty acids such as 3,5,5-trimethylhexanoic acid, 2-hexyldecanoic acid, 2-heptylundecanoic acid, 2- (1,3,3-trimethylbutyl) -5,7,7-trimethyloctanoic acid and 2-octyldodecanoic acid; and unsaturated fatty acids such as trans-9-octadecenoic acidandcis-9-octadecenoicacid. Out of these, linear saturated fatty acids having 14 to 20 carbon atoms such as tetradecanoic acid, hexadecanoic acid and octadecanoic acid and unsaturated fatty acids having 14 to 20 carbon atoms such as trans-9-octadecenoic acid are preferred because a high polishing rate can be achieved. The lubricant composition of the present invention may comprise only one or two or more fatty acids having 8 to 25 carbon atoms.

As for the mixing ratio of the hydrocarbon solvent (1), the organic onium salt (2) and the fatty acid having 8 to 25 carbon atoms (3) in the lubricant composition of the present invention, the amount of the organic onium salt must be 0.001 to 4.999 parts by mass, the amount of the fatty acid must be 0.001 to 4.999 parts by mass, and the total amount of the organic onium salt and the fatty acid must be 0.01 to 5 parts by mass based on 100 parts by mass of the hydrocarbon solvent.

When the amount of the organic onium salt is smaller than 0.001 part by mass, the resistivity of the lubricant composition becomes 1,000 G$\Omega$cm or more, whereby antistatic properties high enough to prevent the electrostatic breakdown of the magnetic head cannot be obtained. When the amount of the organic onium salt is 0.001 part or more by mass, the deterioration of characteristic properties which leads to breakdown can be suppressed. The amount is more preferably 0.01 part or more by mass, particularly preferably 0.1 part or more by mass. When the amount is 0.1 part or more by mass, the amount of a polar solvent added which causes corrosion can be reduced and a satisfactory resistivity of 100 G$\Omega$cm or less can be achieved. As the resistivity is reduced by increasing the amount of the organic onium salt, static electricity is suppressed to obtain high antistatic properties, thereby making it possible to prevent the electrostatic breakdown of the magnetic head. However, as the amount of the organic onium salt increases, the polishing rate tends to drop.

As described above, a reduction in the polishing rate can be improved by adding the fatty acid having 8 to 25 carbon atoms. To obtain this effect, the fatty acid must be added in an amount of 0.001 part or more by mass. When the amount of the fatty acid is smaller than 0.001 part by mass, the smoothness of the polished surface of the magnetic head tends to deteriorate. The amount is more preferably 0.05 part or more by mass, particularly preferably 0.1 part or more by mass. However, when the amount of the fatty acid is too large, the polishing rate tends to drop.

Therefore, the lubricant composition of the present invention must comprise the organic onium salt and the fatty acid in a total amount of 5 parts or less by mass based on 100 pats by mass of the hydrocarbon solvent in order to obtain a practical level of polishing rate. When the total amount is larger than 5 parts by mass, the polishing rate sharply drops. Further, the water absorptivity of the lubricant composition increases, whereby the corrosion of the metal part of the magnetic head readily occurs. The total amount is preferably 3 parts or less by mass, particularly preferably 2.5 parts or less by mass. When the total amount is smaller than 0.01 part by mass, not only sufficiently high antistatic properties are not obtained but also the polishing rate drops and the smoothness of the polished surface of the magnetic head is lost. The total amount is more preferably 0.1 part or more by mass, particularly preferably 0.2 part or more by mass.

As for the preferred amounts of the above three components of the lubricant composition of the present invention, the amount of the organic onium salt (2) is 0.005 to 3 parts by mass, the amount of the fatty acid having 8 to 25 carbon atoms (3) is 0.05 to 3 parts by mass, and the total amount of the organic onium salt and the fatty acid is 0.1 to 5 parts by mass based on 100 parts by mass of the hydrocarbon solvent (1).

More preferably, the amount of the organic onium salt (2) is 0.005 to 2.5 parts by mass, the amount of the fatty acid having 8 to 25 carbon atoms (3) is 0.05 to 2.5 parts by mass, and the total amount of the organic onium salt and the fatty acid is 0.1 to 3 parts by mass based on 100 parts by mass of the hydrocarbon solvent (1). Most preferably, the amount of the organic onium salt (2) is 0.1 to 2 parts by mass, the amount of the fatty acid having 8 to 25 carbon atoms (3) is 0.1 to 2 parts by mass, and the total amount of the organic onium salt and the fatty acid is 0.2 to 2.5 parts by mass based on 100 parts by mass of the hydrocarbon solvent (1).

The lubricant composition of the present invention may comprise components other than the above three components as long as the object and effect of the present invention are not adversely affected. The above organic onium salt is apt to be hardly dissolved in the hydrocarbon solvent which is a nonpolar solvent and may cause crystal precipitation along the passage of time even when it is dissolved in the hydrocarbon solvent. Therefore, the solubility of the organic onium salt is preferably improved by adding a small amount of a polar solvent. However, since the addition of the polar solvent increases the water absorptivity of the lubricant composition, it is not preferred to add a large amount of the polar solvent. Therefore, when the polar solvent is used, it is added in an amount of 0.1 to 20 parts by mass, more preferably 1 to 10 parts by mass based on 100 parts by mass of the above hydrocarbon solvent.

Examples of the polar solvent include linear primary alcohols such as 1-hexanol, 1-heptanol, 1-octanol, 1-decanol, 1-dodecanol and 9-octadecenyl alcohol; secondary alcohols such as isopropyl alcohol; polyhydric alcohols such as diethylene glycol and glycerin; ethers such as diethyl ether, diisopropyl ether, tetrahydrofuran, 1,4-dioxane, ethylene glycol dimethyl ether, propylene glycol dimethyl ether and diethylene glycol diethyl ether; ether monoalcohols such as ethylene glycol monomethyl ether, diethylene glycol monomethyl ether, diethylene glycol monobutyl ether, triethylene glycol monomethyl ether, dipropylene glycol monomethyl ether and dipropylene glycol monobutyl ether; esters such as ethyl acetate, propyl acetate and butyl acetate; ketones such as acetone, methyl ethyl ketone, 2-pentanone, 3-pentanone and 2-hexanone; and nitriles such as acetonitrile and propionitrile.

Out of these, linear primary alcohols having 6 to 20 carbon atoms such as 1-hexanol, 1-heptanol, 1-octanol, 1-decanol, 1-dodecanol and 9-octadecenyl alcohol and ether monoalcohols such as diethylene glycol monobutyl ether, triethylene glycol monomethyl ether, dipropylene glycol monomethyl ether and dipropylene glycol monobutyl ether are preferred because they hardly increase water absorptivity and have an excellent effect of improving the solubility of the organic onium salt.

The lubricant composition can further comprise a known abrasion resisting agent, extreme pressure additive, anticorrosive and antifoaming agent as long as the effect of the present invention is not adversely affected.

The process of manufacturing the lubricant composition of the present invention is not particularly limited. A predetermined amount of the organic onium salt and a predetermined amount of the fatty acid having 8 to 25 carbon atoms and optional components are mixed with the hydrocarbon solvent to be dissolved therein. The method of dissolving the organic onium salt in the solvent is not particularly limited. Although the organic onium salt may be added to the solvent directly to be dissolved therein, as the organic onium salt may hardly dissolve in the hydrocarbon solvent as described above, preferably, it is heated to be molten and added to the hydrocarbon solvent, or mixed with another liquid component which can easily dissolve the organic onium salt, for example, a polar solvent such as a primary chain alcohol or a fatty acid having 8 to 25 carbon atoms to be dissolved therein and then mixed with the hydrocarbon solvent. When undissolved matter is produced, it is preferably removed by filtration.

The lubricant composition of the present invention is used to polish a magnetic head with fixed abrasive grains. When the magnetic head is a magnetic head having a narrow gap thickness, such as MR, GMR or TMR, the lubricant composition is preferably used for final polishing and particularly preferably used for the polishing of a magnetic head having a magnetically complex structure, such as GMR or TMR.

As described above, the lubricant composition of the present invention can obtain high antistatic properties required for the prevention of ESD while retaining a sufficiently high polishing rate when it comprises a combination of the organic onium salt having a specific structure as an antistatic component and the fatty acid. The lubricant composition makes it easy to suppress the corrosion of a device and production equipment caused by the entry of water.

Thereby, the control voltage of static electricity at the time of polishing can be reduced to 1 V or less, whereby the breakdown of a device and reductions in the reliability and productivity of the obtained magnetic head caused by static electricity hardly occur. Even a magnetic head having a magnetically complex structure and a narrow gap thickness, such as GMR or TMR, can be manufactured at a high yield.

EXAMPLES

The following examples are provided for the purpose of further illustrating the present invention but are in no way to be taken as limiting.
(1) evaluation of antistatic properties
The antistatic properties were evaluated by the resistivity of the composition. The resistivity was measured at room temperature by using the TOR-2000 continuous resistivity meter of Tokuyama Corporation. As resistivity becomes lower, conductivity becomes higher and therefore antistatic properties become better.
(2) evaluation of storage stability
The resistivity of the composition was measured after an accelerating experiment in which it was heated at 80° C. for 7 days so as to evaluate its storage stability by an increase rate from its initial resistivity. As the increase rate becomes smaller, the storage stability becomes higher. When the increase rate falls within a measurement error, "no change" is entered.
(3) Measurement of Water Content after Leaving to Stand
After the composition was stirred in an open atmosphere at room temperature for 24 hours, its water content was measured with a karl Fischer aquameter.
(4) Measurement of Polishing Rate
In this example, a pseudo-magnetic head bar manufactured by cutting a groove having a depth of about 0.1 μm in an AlTiC substrate (surface polished, manufactured by Nippon Tungsten Co., Ltd.) and cutting the substrate into a bar-like form having a thickness of 1 mm in a direction perpendicular to the groove with an automatic dicing machine was used. In a polishing experiment, the HYPREZEJ-3801N automatic precision lapping machine of Nippon Engis Co., Ltd. and a lapping plate manufactured by charging oily diamond slurry having a diameter of 0.1 μm into a tin/lead platen, cleaning the platen with a hydrocarbon solvent and wiping off the slurry were used. As for polishing conditions with the lubricant composition, polishing was carried out for 5 minutes at a platen revolution of 5 rpm and a load of 1 kg/cm$^2$ by spraying the lubricant composition for 3 seconds at intervals of 30 seconds. After the end of polishing, SEM was used to obtain a polishing rate from a reduction in the depth of the groove.
(5) Observation of Polished Surface
The polished surface was observed through SEM (XL30SFEG of FEI Co., Ltd.). When a scratch or a local dent was seen, the polished surface was judged as "rough" and when these were not seen, the polished surface was judged as "excellent".

Example 1

Tetraoctylammonium.2,2,2-trifluoro-N-(trifluoromethanesulfonyl)acetamide was used as the organic onium salt. 0.15 g of this substance was dissolved in 2 g of oleic acid, and the resulting solution was added to 100 g of the TPS-2250 normal paraffin solvent (of Tokuyama Corporation, ignition point of 71° C.) so as to obtain an achromatic transparent homogeneous composition. When the resistivity of this composition was measured, it was 24 GΩcm. When the storage stability of this composition was checked, the resistivity of this composition was 26 GΩcm which was 8% higher than before.

When 1,000 V was applied to this composition by using the Charged Plate Monitor 158 of TREK Co., Ltd. to measure the time during which the voltage dropped to 500 V, it was 10 seconds which proved that the composition had satisfactory antistatic properties. When it was left to stand, the water content of this composition was 110 ppm.

When polishing was carried out by using this composition, the polishing rate was 200 nm/min. When the polished surface was observed, it was "excellent".

Example 2

Tetraoctylammonium. bis (trifluoromethanesulfonyl) imide was used as the organic onium salt. 0.15 g of this organic onium salt and 0.6 g of oleic acid were dissolved in 2 g of octanol, and the resulting solution was added to 100 g of an isoparaffin solvent (Nisseki Isosol 400 of Shin Nippon Petrochemical Co., Ltd.) so as to obtain an achromatic transparent homogeneous composition. When the resistivity of this composition was measured, it was 14 GΩcm. When the storage stability of this composition was checked, it was judged as "no change".

When polishing was carried out by using this composition, the polishing rate was 150 nm/min. When the polished surface was observed, it was "excellent".

Examples 3 to 5 and Comparative Examples 1 to 5

The procedure of Example 2 was repeated except that the amounts of tetraoctylammonium. bis(trifluoromethanesulfonyl)imide (organic onium salt) and oleic acid were changed as shown in Table 1. The results are shown in Table 1.

TABLE 1

|  | Organic onium salt (parts by weight) | oleic acid (parts by weight) | octanol (parts by weight) | resistivity (GΩcm) |
|---|---|---|---|---|
| Ex. 1 | 0.15 | 2 | — | 24 |
| Ex. 2 | 0.15 | 0.6 | 2 | 14 |
| Ex. 3 | 0.08 | 0.6 | 2 | 20 |
| Ex. 4 | 0.3 | 0.6 | 2 | 3 |
| Ex. 5 | 0.15 | 1.5 | 2 | 13 |
| Ex. 6 | 1 | 1.5 | 2 | 0.3 |
| C. Ex. 1 | — | — | 2 | >1000 |
| C. Ex. 2 | — | 1.5 | 2 | >1000 |
| C. Ex. 3 | 0.30 | — | 2 | 4 |
| C. Ex. 4 | 2 | 4 | 2 | 0.1 |
| C. Ex. 5 | 0.3 | 10 | 2 | 2 |

|  | Polishing rate (nm/min) | surface state | storage stability (%) | water content after leaving to stand (ppm) |
|---|---|---|---|---|
| Ex. 1 | 200 | excellent | 8 | 110 |
| Ex. 2 | 150 | excellent | no change | 130 |
| Ex. 3 | 150 | excellent | no change | 130 |
| Ex. 4 | 140 | excellent | no change | 140 |
| Ex. 5 | 200 | excellent | no change | 180 |
| Ex. 6 | 170 | excellent | no change | 230 |
| C. Ex. 1 | 10 | rough | no change | 90 |
| C. Ex. 2 | 200 | excellent | no change | 170 |
| C. Ex. 3 | 10 | rough | no change | 110 |
| C. Ex. 4 | 50 | rough | no change | 410 |
| C. Ex. 5 | 10 | rough | 8 | 640 |

Ex.: Example
C. Ex.: Comparative Example

Example 7

0.08 g of tetraoctylammonium.dicyanoamide as the organic onium salt and 0.6 g of oleic acid were added to 100 g of an isoparaffin solvent (Nisseki Isosol 400) to obtain an achromatic transparent homogeneous composition. When the resistivity of this composition was measured, it was 140 GΩcm. When the storage stability of this composition was checked, it was judged as "no change".

When polishing was carried out by using this composition, the polishing rate was 150 nm/min. When the polished surface was observed, it was "excellent".

Examples 8 to 15 and Comparative Example 6

Compositions were prepared and evaluated in the same manner as in Example 2 except that compounds shown in Table 2 were used as the organic onium salt. The results are shown in Table 2.

TABLE 2

| Ex. | Organic onium salt | resistivity (GΩcm) | Polishing rate (nm/min) | surface state | storage stability (%) | water content after leaving to stand (ppm) |
|---|---|---|---|---|---|---|
| 7 | 0.08 g of tetraoctylammonium dicyanoamide | 140 | 150 | excellent | no change | 50 |
| 8 | 0.15 g of tetraoctylammonium dicyanoamide | 60 | 150 | excellent | no change | 130 |
| 9 | 0.15 g of tetraoctylammonium bis(trifluoroacetyl)imide | 30 | 150 | excellent | 10 | 140 |
| 10 | 0.15 g of tetraoctylphosphonium bis(trifluoromethanesulfonyl)imide | 14 | 150 | excellent | no change | 130 |
| 11 | 0.15 g of hexyltrioctylammonium bis(trifluoromethanesulfonyl)imide | 16 | 150 | excellent | no change | 130 |
| 12 | 0.15 g of tetrahexylammonium bis(trifluoromethanesulfonyl)imide | 15 | 150 | excellent | no change | 130 |
| 13 | 0.15 g of tetra-dodecylammonium bis(trifluoromethanesulfonyl)imide | 20 | 150 | excellent | no change | 130 |

TABLE 2-continued

| Ex. | Organic onium salt | resistivity (GΩcm) | Polishing rate (nm/min) | surface state | storage stability (%) | water content after leaving to stand (ppm) |
|---|---|---|---|---|---|---|
| 14 | 0.15 g of benzyltrioctylammonium bis(trifluoromethanesulfonyl) imide | 17 | 150 | excellent | no change | 130 |
| 15 | 0.15 g of phenyltrioctylammonium bis(trifluoromethanesulfonyl) imide | 16 | 150 | excellent | no change | 130 |
| C. Ex. 6 | 0.15 g of trimethylhexylammonium bis(trifluoromethanesulfonyl) imide | insoluble | — | — | — | — |

Ex.: Example C. Ex.: Comparative Example

Examples 16 to 20 and Comparative Example 7

Compositions were prepared and evaluated in the same manner as in Example 2 except that 0.6 g of a fatty acid shown in Table 3 was used as the fatty acid. The results are shown in Table 3.

TABLE 3

| Ex. | fatty acid | resistivity (GΩcm) | Polishing rate (nm/min) | surface state | storage stability (%) | water content after leaving to stand (ppm) |
|---|---|---|---|---|---|---|
| 16 | Nonanoic acid | 14 | 100 | excellent | no change | 140 |
| 17 | Dodecanoic acid | 14 | 100 | excellent | no change | 130 |
| 18 | Tetradecanoic acid | 15 | 150 | excellent | no change | 130 |
| 19 | 2-octyldecanoic acid | 15 | 150 | excellent | no change | 130 |
| 20 | eicosanoic acid | 16 | 150 | excellent | no change | 120 |
| C. Ex. 7 | pentanoic acid | 14 | 50 | rough | no change | 160 |

Ex.: Example C. Ex.: Comparative Example

Examples 21 to 27

Compositions were prepared and evaluated in the same manner as in Example 2 except that each type and amount of a polar solvent shown in Table 4 was used in place of octanol. The results are shown in Table 4.

Examples 28 to 30

Compositions were prepared and evaluated in the same manner as in Example 2 except that a hydrocarbon solvent shown in Table 5 was used in place of an isoparaffin solvent (Nisseki Isosol 400). The results are shown in Table 5.

TABLE 4

| Ex. | polar solvent | Amount (g) | resistivity (GΩcm) | Polishing rate (nm/min) | surface state | storage stability (%) | water content after leaving to stand (ppm) |
|---|---|---|---|---|---|---|---|
| 2 | Octanol | 2 | 14 | 150 | excellent | no change | 130 |
| 21 | Dodecanol | 2 | 15 | 150 | excellent | no change | 130 |
| 22 | 9-octadecenyl alcohol | 2 | 19 | 150 | excellent | no change | 120 |
| 23 | diethylene glycol monomethyl ether | 2 | 3 | 140 | excellent | no change | 200 |
| 24 | diethylene glycol monobutyl ether | 2 | 4 | 150 | excellent | no change | 190 |
| 25 | diethylene glycol monobutyl ether | 10 | 0.6 | 100 | excellent | no change | 828 |
| 26 | triethylene glycol monobutyl ether | 2 | 5 | 150 | excellent | no change | 190 |
| 27 | dipropylene glycol monobutyl ether | 2 | 8 | 150 | excellent | no change | 180 |

Ex.: Example

TABLE 5

| Ex. | hydrocarbon solvent | resistivity (GΩcm) | Polishing rate (nm/min) | surface state | storage stability (%) | water content after leaving to stand (ppm) |
|---|---|---|---|---|---|---|
| 2 | Isoparaffin (Nisseki Isosol 400) | 14 | 150 | excellent | no change | 130 |
| 28 | Naphthene (Nisseki Naphthesol 200) | 8 | 140 | excellent | no change | 150 |
| 29 | Normal paraffin (Nisseki Grade L) | 7 | 130 | excellent | no change | 120 |
| 30 | Aromatic hydrocarbon (Nisseki Hisol SAS Grade 296) | 27 | 100 | excellent | no change | 140 |

Ex.: Example

The invention claimed is:

1. A lubricant composition for polishing a magnetic head with fixed abrasive grains, said lubricant composition comprising:
    (1) 100 parts by mass of a hydrocarbon solvent;
    (2) 0.001 to 4.999 parts by mass of an organic onium salt represented by the following formula (I):

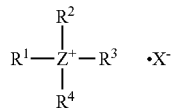

(I)

wherein Z is a nitrogen atom or a phosphorus atom, $R^1$, $R^2$, $R^3$ and $R^4$ are each independently a hydrocarbon group having 4 to 20 carbon atoms, with the proviso that the ratio of the number of carbon atoms of a hydrocarbon group having the largest number of carbon atoms to the number of carbon atoms of a hydrocarbon group having the smallest number of carbon atoms out of $R^1$, $R^2$, $R^3$ and $R^4$ is 2 or less, and $X^-$ is an anion represented by the following formula (II):

$$A^1\text{-}N^-\text{-}A^2 \qquad (II)$$

wherein $A^1$ and $A^2$ are each independently a fluoroacyl group, fluoroalkoxycarbonyl group, fluoroalkylsulfonyl group, fluoroalkoxysulfonyl group or nitrile group; and
    (3) 0.001 to 4.999 parts by mass of a fatty acid having 8 to 25 carbon atoms, the total amount of the organic onium salt and the fatty acid being 0.01 to 5 parts by mass.

2. The lubricant composition according to claim 1 which further comprises (4) 0.1 to 20 parts by mass of an alcohol having 6 to 20 carbon atoms based on 100 parts by mass of the hydrocarbon solvent (1).

3. The lubricant composition according to claim 2, wherein the alcohol having 6 to 20 carbon atoms (4) is a linear primary alcohol or an ether monoalcohol.

* * * * *